Patented Sept. 22, 1936

2,054,829

UNITED STATES PATENT OFFICE 2,054,829

WATER INSOLUBLE AZO DYESTUFFS DERIVED FROM DIHYDROBENZOCARBAZOLES

Wilhelm Neelmeier, Leverkusen-Wiesdorf, Heinrich Morschel, Cologne-Deutz, and Otto Goll, Leverkusen-I. G.-Werk, Germany, assignors to General Aniline Works, Inc., New York, N. Y., a corporation of Delaware No Drawing. Application February 13, 1933, Serial No. 656,625. In Germany February 18, 1932

8 Claims. (Cl. 260—46.1)

The present invention relates to new water-insoluble azodyestuffs, more particularly it relates to dyestuffs which may be represented by the probable general formula:

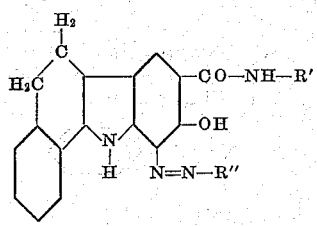

wherein R' stands for a non-sulfonated and non-carboxylated aromatic radical, such as a radical of the benzene, naphthalene or carbazole series, and R" stands for the radical of a non-sulfonated and non-carboxylated diazotized component suitable for producing azodyestuffs; as substituents which may occur in the nuclei R' and R" there may be mentioned by way of example, alkyl, alkoxy, halogen and the nitro group.

Our new water-insoluble dyestuffs are obtainable by coupling in substance or on a substratum a diazotized non-sulfonated and non-carboxylated amine suitable for producing azodyestuffs with a 2-hydroxy-5,6-dihydro-7,8-benzocarbazole-3-carboxylic acid arylamide. The shades, when produced on the fibre, are distinguished by good fastness properties.

The coupling components used in our invention have been described and claimed in the application for Letters Patent Serial No. 656,623, filed February 13, 1933, and entitled: "New dihydrobenzocarbazole compounds", two of us being joint inventors in said application. They are obtainable by carbonating 2-hydroxy-5,6-dihydro-7,8-benzocarbazole by a treatment with carbon dioxide in the presence of an alkali metal carbonate at superatmospheric pressure and an elevated temperature and condensing the 2-hydroxy-5,6-dihydro-7,8-benzocarbazole-3-carboxylic acid formed with non-sulfonated and non-carboxylated primary aromatic or heterocyclic amines by dissolving the said carboxylic acid and said amine in an inert organic solvent, adding an acid- or water-binding agent and heating to an elevated temperature in order to form the corresponding arylamides.

The invention is illustrated by the following example, without being limited thereto:

*Example.*—20 grams of well boiled and dried cotton yarn are impregnated for half an hour in one litre of a bath containing 2,5 grams of 1-(2'-hydroxy-5',6'-dihydro-7',8'-benzocarbazole-3'-carbonylamino)-4-methoxybenzene, 10 ccs. of aqueous caustic soda of 34° Bé. and 10 ccs. of Turkey red oil of 50% strength, well squeezed and, without drying, introduced for about half an hour into a diazo solution of 1 litre, prepared in the usual manner by diazotizing 2.5 grams of 2,5-dichloro-1-aminobenzene, and neutralizing the mineral acid by the addition of sodium acetate. The cotton is then rinsed, soaped in a boiling bath and dried. A beautiful orange-brown of good fastness properties is thus obtained.

The dyestuff probably has the following formula:

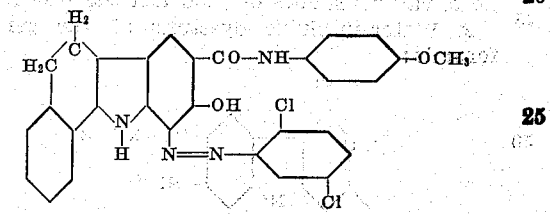

In the following table there are given some further combinations and their shades, obtainable in an analogous manner:

| Coupling component | Diazotization component | Shade |
|---|---|---|
| 1 - (2' - hydroxy - 5',6' - dihydro-7',8' - benzocarbazole - 3' - carbonylamino) - 4 - methoxybenzene. | 4 - chloro - 2 - amino - 1 - methylbenzene. | Reddish yellowish brown. |
| Do | 6 - chloro - 2 - amino - 1 - methylbenzene. | Yellowish brown. |
| Do | 4 - chloro - 2 - amino - 1 - methoxybenzene. | Brown. |
| Do | 3,2' - dimethyl - 4 - aminoazobenzene. | Reddish brown. |
| Do | 2 - aminonaphthalene. | Brown. |
| 1 - (2' - hydroxy - 5',6' - dihydro-7',8' - benzocarbazole - 3' - carbonylamino) - 2 - methylbenzene. | 2,4' - dimethyl - 2'-nitro - 3 - methoxy - 4 - amino - azobenzene. | Dark reddish brown. |

| Coupling component | Diazotization component | Shade |
|---|---|---|
| 1 - (2' - hydroxy - 5',6' - dihydro - 7',8' - benzocarbazole - 3' - carbonylamino) - 2 - methylbenzene. | 4 - nitro - 2 - amino - 1 - methylbenzene. | Yellowish brown. |
| 1 - (2' - hydroxy - 5',6' - dihydro 7',8' - benzocarbazol - 3' - carbonylamino) - 4 - chlorobenzene. | 6 - chloro - 2 - amino - 1 - methylbenzene. | Reddish yellowish brown. |
| Do | 6 - amino - 4 - benzoylamino - 1,3 - dimethylbenzene. | Orange brown. |
| 1 - (2' hydroxy - 5',6' - dihydro - 7',8' - benzocarbazole - 3 carbonylamino) chlorobenzene. | 3-chloroaniline | Yellowish brown. |
| Do | 4 - chloro - 2 - amino - 1 - methylbenzene. | Do. |
| 1 - (2' - hydroxy - 5',6' - benzocarbazole 3' - carbonylamino) - 2 - methyl - 4 - methoxybenzene. | 4-nitro - 2 - amino - 1 - methylbenzene. | Reddish yellowish brown. |
| Do | 6 - chloro - 2 - amino - 1 - methylbenzene. | Yellowish brown. |
| 1 - (2' - hydroxy - 5',6' - dihydro - 7',8' - benzocarbazole 3' - carbonylamino) - 3 - nitrobenzene. | 4 - chloro - 2 - toluidine. | Do. |
| 2 - (2' - hydroxy - 5',6' - dihydro - 7',8' - benzocarbazole - 3' - carbonylamino) - naphthalene. | 2-chloroaniline | Do. |
| - (2' - hydroxy - 5',6' - dihydro - 7',8' - benzocarbazole - 3' - carbonylamino -) - carbazole. | 4 - nitro - 2 - anisidine. | Brown. |

We claim:

1. Water-insoluble dyestuffs of the general formula:

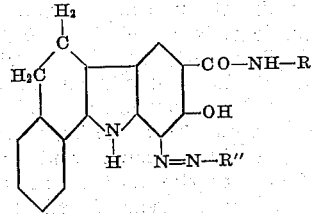

wherein R' stands for a non-sulfonated and non-carboxylated aromatic radical and R" stands for a non-sulfonated and non-carboxylated radical of a diazotized component suitable for producing azodyestuffs, yielding, when produced on the fibre, various shades of good fastness properties.

2. Water-insoluble dyestuffs of the general formula:

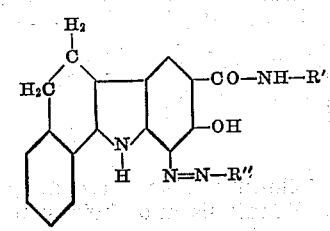

wherein R' stands for a non-sulfonated and non-carboxylated radical of the benzene or naphthalene series and R" stands for a non-sulfonated and non-carboxylated radical of a diazotized component suitable for producing azodyestuffs, yielding, when produced on the fibre, various shades of good fastness properties.

3. Water-insoluble dyestuffs of the general formula:

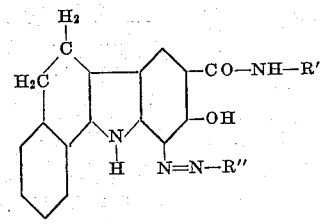

wherein R' and R" stand for non-sulfonated and non-carboxylated radicals of the benzene or naphthalene series, yielding, when produced on the fibre, various shades of good fastness properties.

4. The dyestuff of the formula:

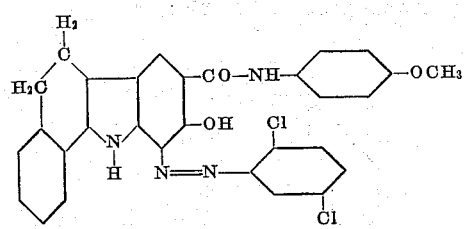

yielding, when produced on the fibre, orange-brown shades of good fastness properties.

5. Fibre dyed with a dyestuff as claimed in claim 1.

6. Fibre dyed with a dyestuff as claimed in claim 2.

7. Fibre dyed with a dyestuff as claimed in claim 3.

8. Fibre dyed with the dyestuff as claimed in claim 4.

WILHELM NEELMEIER.
HEINRICH MORSCHEL.
OTTO GOLL.